United States Patent
Gordon

(10) Patent No.: US 9,508,503 B2
(45) Date of Patent: Nov. 29, 2016

(54) INCREASING YIELD WITH TACTILE BUTTON GAP ADJUSTMENT

(71) Applicant: Microsoft Corporation, Redmond, WA (US)

(72) Inventor: Michael C. Gordon, Sammamish, WA (US)

(73) Assignee: Microsoft Technology Licensing, LLC, Redwood, WA (US)

( * ) Notice: Subject to any disclaimer, the term of this patent is extended or adjusted under 35 U.S.C. 154(b) by 165 days.

(21) Appl. No.: 14/260,968

(22) Filed: Apr. 24, 2014

(65) Prior Publication Data
US 2015/0311013 A1    Oct. 29, 2015

(51) Int. Cl.
| | |
|---|---|
| *H01H 3/12* | (2006.01) |
| *H01H 13/14* | (2006.01) |
| *H01H 13/70* | (2006.01) |
| *H01H 13/88* | (2006.01) |
| *G06F 1/16* | (2006.01) |

(52) U.S. Cl.
CPC ............ *H01H 13/70* (2013.01); *G06F 1/16* (2013.01); *H01H 13/88* (2013.01); *H01H 2207/04* (2013.01); *H01H 2229/018* (2013.01)

(58) Field of Classification Search
CPC .......... H01H 9/00; H01H 3/12; H01H 13/14; H01H 13/52; H01H 1/20; H01H 1/5805; H01H 2205/002; H01H 2001/5816
USPC ........................................ 200/295, 341, 292
See application file for complete search history.

(56) References Cited

U.S. PATENT DOCUMENTS

| | | |
|---|---|---|
| 5,399,823 A | 3/1995 | McCusker |
| 6,370,031 B2 | 4/2002 | Park et al. |
| 6,439,787 B1 | 8/2002 | Kerr |
| 6,747,218 B2 | 6/2004 | Huseman et al. |
| 6,828,516 B1 | 12/2004 | Han |
| 7,902,475 B2 | 3/2011 | Moolsintong et al. |
| 8,415,570 B2 | 4/2013 | Dabov et al. |
| 2008/0100568 A1 | 5/2008 | Koch et al. |
| 2013/0327621 A1 | 12/2013 | Dinh et al. |

FOREIGN PATENT DOCUMENTS

EP        1389787 A2      2/2004

OTHER PUBLICATIONS

"International Search Report and Written Opinion Issued in PCT Application No. PCT/US2015/026051", Mailed Date: Sep. 23, 2015, 17 Pages.
Szczys, Mike, "Repair stuck iPod Nano buttons", Published on: Feb. 23, 2011, Available at: http://hackaday.com/2011/02/23/repair-stuck-ipod-nano-buttons/, 14 pages.
"International Preliminary Report on Patentability Issued in PCT Application No. PCT/US2015/026051", Mailed Date: Feb. 22, 2016, 8 Pages.

*Primary Examiner* — Renee S Luebke
*Assistant Examiner* — Anthony R. Jimenez
(74) *Attorney, Agent, or Firm* — Qudus Olaniran; Judy Yee; Micky Minhas

(57) ABSTRACT

Embodiments of the disclosure optimize yield of a product having one or more switch assemblies and improve impact robustness of the product without sacrificing tactile feel. Based on failure limits of a gap in the switch assembly during manufacturing, a single size for a shim is calculated. The shim is selectively inserted into the switch assembly based on the gap to maximize the switch assembly yield while minimizing cost. In some examples, a bracket is designed for the switch assemblies. The bracket has datum surfaces in three dimensions and a beam tuned to absorb energy during an impact event to prevent switch failure.

20 Claims, 15 Drawing Sheets

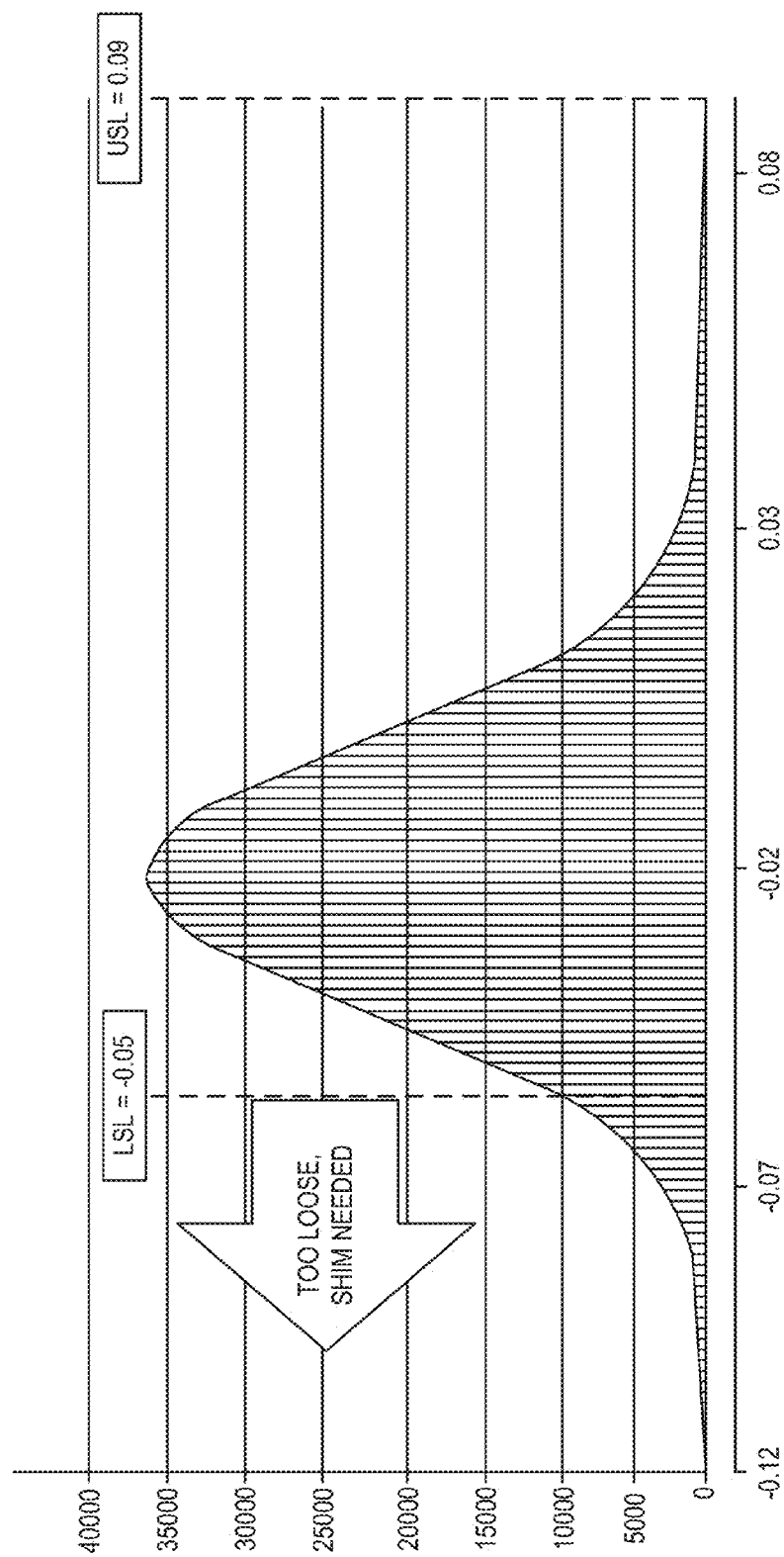

INCREASING YIELD WITH TACTILE BUTTON GAP ADJUSTMENT

BACKGROUND

Tactile buttons on a mobile device are typically placed on outer exposed surfaces for ease of use and ergonomics reasons. These buttons typically protrude from the device surface so that they are easy to displace with a finger to a point of switch activation. To provide a high-quality button press experience, the gap between the button and a switch actuator must be very tightly controlled during the manufacturing process. If the gap is too large, the button will rock from side-to-side during button press, resulting in an undesirable feel to the user. If the gap is too small (e.g., interference), the tactile feel of the switch is undesirable due to the small amount of button travel. If the gap is too large or too small, the product yield decreases due to repair or discard of the devices.

Some solutions focus on tightly controlling dimensions of the switch assembly during manufacturing via short tolerance chains, custom adjustment of each of the switch assemblies using shims of various sizes, accepting poor yield, or accepting (and selling) devices with poor quality tactile feel. Each of these solutions are undesirable. For example, tightly controlling the dimensions is expensive and often infeasible due to device architecture constraints. Custom adjustment of each of the switch assemblies is a labor intensive effort and logistically difficult, resulting in higher costs for the user. Yield loss is also expensive, while poor quality tactile feel results in a had user experience and loss of sales.

Further, impact events such as an accidental drop may result in a loss of tactility and/or functionality of the switch. For example, materials inside the switch may be permanently deformed or cracked. To prevent this, some existing designs for the switch assemblies rely only on inherent energy absorption characteristics of the device chassis. When subject to the full force of impact during accidental drops, such existing switch assemblies and buttons are often damaged, adversely affecting customer satisfaction.

SUMMARY

Embodiments of the disclosure optimize a product yield by defining failure limits of a gap in a plurality of switch assemblies. The gap in each of the plurality of switch assemblies represents an amount of travel from a button to a switch actuator. A single size for a shim is calculated based on the defined failure limits to optimize a yield for the plurality of switch assemblies. For each of the plurality of switch assemblies, the shim is selectively inserted into the switch assembly based on the gap for the switch assembly. In some examples, a bracket designed for receiving the button, shim and switch actuator is used to absorb the impact energy. The bracket has a plurality of datum surfaces in three dimensions that are tuned to prevent switch failure during the impact event.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 6B is an exemplary switch-to-button actuator gap distribution after being intentionally shifted such that all devices that fall outside of specification limits have a large switch to button actuator gap.

Corresponding reference characters indicate corresponding parts throughout the drawings.

DETAILED DESCRIPTION

Figure 1:
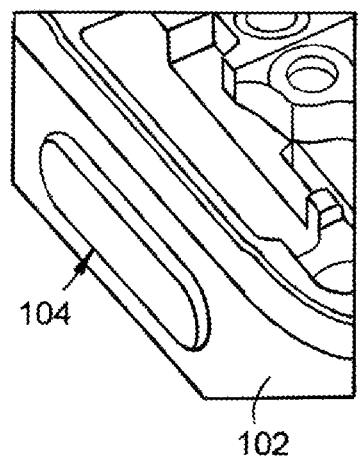
FIG. 1 is a cross-sectional side-view representation of a button arrangement in a computing device.

Referring to the figures, embodiments of the disclosure optimize yield through tactile button gap adjustment while providing an improvement in impact robustness. Failure limits of a gap 512 are defined in a plurality of switch assemblies configured to receive a button 104. The gap 512 in each of the plurality of switch assemblies represents an amount of travel from a button actuator surface 508 to a switch actuator surface 510. A single size for a shim 300 is calculated based on the defined failure limits to optimize, or otherwise increase, a yield for the plurality of switch assemblies. The shim 300 is selectively inserted into each of the plurality of switch assemblies based on the measured gap 512 for the switch assembly. In some embodiments, a bracket 200 contacts the button 104, shim 300, and a switch 504. The bracket 200 has a plurality of datum surfaces in three dimensions that are tuned to absorb impact energy during an impact event (e.g., an accidental drop) to prevent switch failure.

Aspects of the disclosure enable quick and accurate adjustment of the gap between the switch actuator surface 510 and the button actuator surface 508 during device assembly. Further aspects of the disclosure enable accurate positioning of a switch flexible printed circuit (FPC) 502 relative to the button actuator surface 508 in one or more dimensions (e.g., in all axes). This maximizes tactile button assembly yield and feel while minimizing cost. Aspects of the disclosure further provide features to hold the adjustment shim 300 in place, the switch stack assembly (FPC 502 and bracket 200) in the chassis 102, and the switch FPC 502 in the desired location without fasteners or adhesives. This significantly eases rework and repair, and allows recycling of parts.

Further aspects of the disclosure provide features that absorb impact energy to increase drop survivability. The bracket 200 provides a flexible support beam behind the switch 504 to improve impact robustness without sacrificing tactile feel. With regard to the buttons, warranty claims due to defective or failed buttons are reduced thereby providing enhanced user satisfaction throughout the product life cycle.

Referring to FIG. 1, an exemplary block diagram illustrates a computing device with the button 104 installed in a chassis 102 of the computing device. The computing device includes any chassis with one or inure buttons or other mechanical means for receiving user input. For example, the computing device may include a mobile computing device or any other portable device. In some embodiments, the computing device includes a mobile telephone, laptop, tablet, computing pad, netbook, gaming device, digital camera, wristwatch devices, pendant devices, headphone and earpiece devices, other wearable miniature devices and/or portable media players. The computing device may also include less portable devices such as desktop personal computers, kiosks, and tabletop devices. Additionally, the computing device may represent a group of processing units or other computing devices.

The computing device has the button 104 that protrudes from the device surface allowing the button 104 to be easily displaced (e.g., with a finger or stylus) to a point of switch activation. The button 104 may activate functionality associated with the computing device, such as volume control, power on/off, camera, and the like. In some embodiments, the computing device includes separate buttons 104 for providing volume control, power on/off, camera functionality, and the like.

Figure 2A:
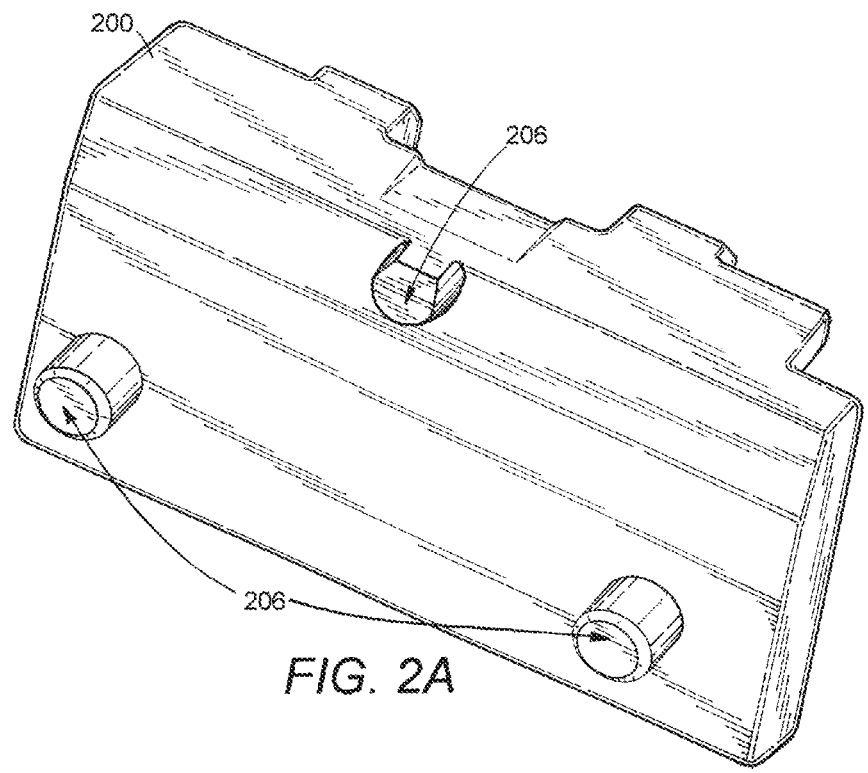
FIG. 2A is an exemplary cross section view (e.g., front) of a bracket designed to receive a shim, and absorb impact energy during an impact event.
Figure 2B:
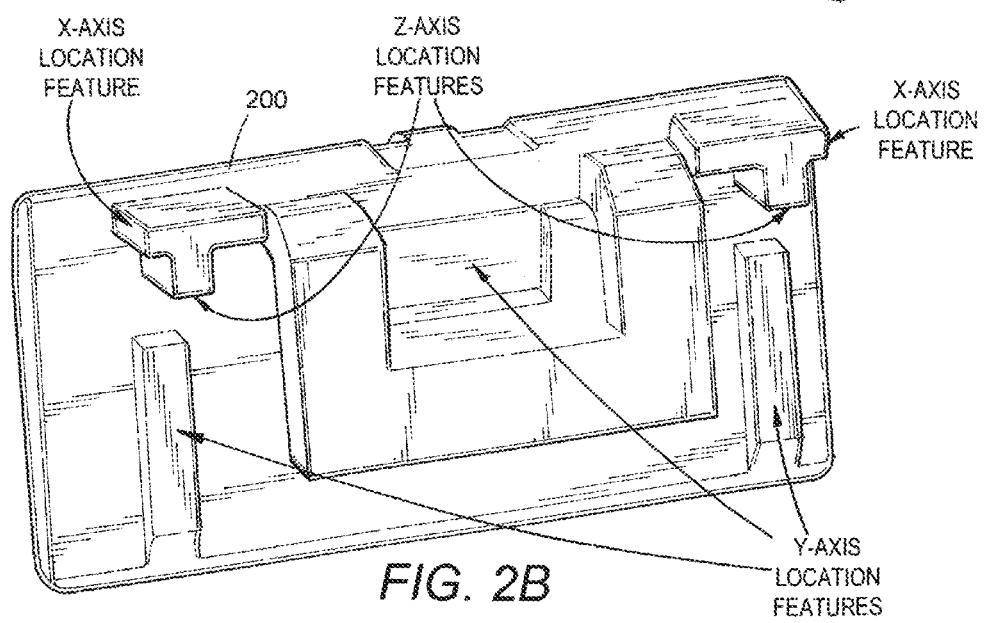
FIG. 2B is an exemplary cross section view (e.g., back) of a bracket designed to receive a shim, and absorb impact energy during an impact event.

Referring next to FIGS. 2A and 2B, an exemplary diagram illustrates the bracket 200. The bracket 200 has a plurality of datum surfaces in three dimensions (e.g., x-axis, y-axis, and z-axis location features). The datum surfaces include at least two datum feet 202 and a beam 204. Each of the datum feet 202 has a height (e.g., the space behind the switch between the plastic bracket and the rigid chassis). The beam 204 has a width and a thickness. The beam 204 is transverse across the bracket 200, in some examples. The thickness of the beam 204 prevents failures from impact and has a stiffness that provides a feel desirable to a user. Further, the height of the datum feet 202, width of the beam 204 and thickness of the beam 204 are tuned to prevent the switch failure during the impact event. Exemplary values for the height of the datum feet 202, width of the beam 204, and thickness of the beam 204 are dynamically calculated based on the gap as described herein. Alternatively, the height of the datum feet 202, width of the beam 204, and thickness of the beam 204 are dependent on each other. In still another embodiment, the height of the datum feet 202, width of the beam 204, and thickness of the beam 204 are predefined.

In one example, the nominal values and the approximate limits for the device geometry are shown in Table 1 below.

TABLE 1

Dimensions and Nominal Values.

| Dimension | Nominal Value | Range |
| --- | --- | --- |
| Foot Height | 0.22 mm | +0.2, −0.15 mm |
| Beam Width | 5.85 mm | ±2 mm |
| Beam Thickness | 0.85 mm | ±0.4 mm |

The values shown in Table 1 above are driven by switch type, switch travel, and switch size. Further, the amount of button protruding from the outer surface of the chassis 102 and the material(s) comprising the button also drive the bracket dimensions. Dimensions other than those shown in Table 1 are within the scope of the disclosure. In some examples, the beam material is PC/ABS, while the chassis material is 6061 T6, which is essentially rigid relative to the plastic bracket.

Figure 5A:
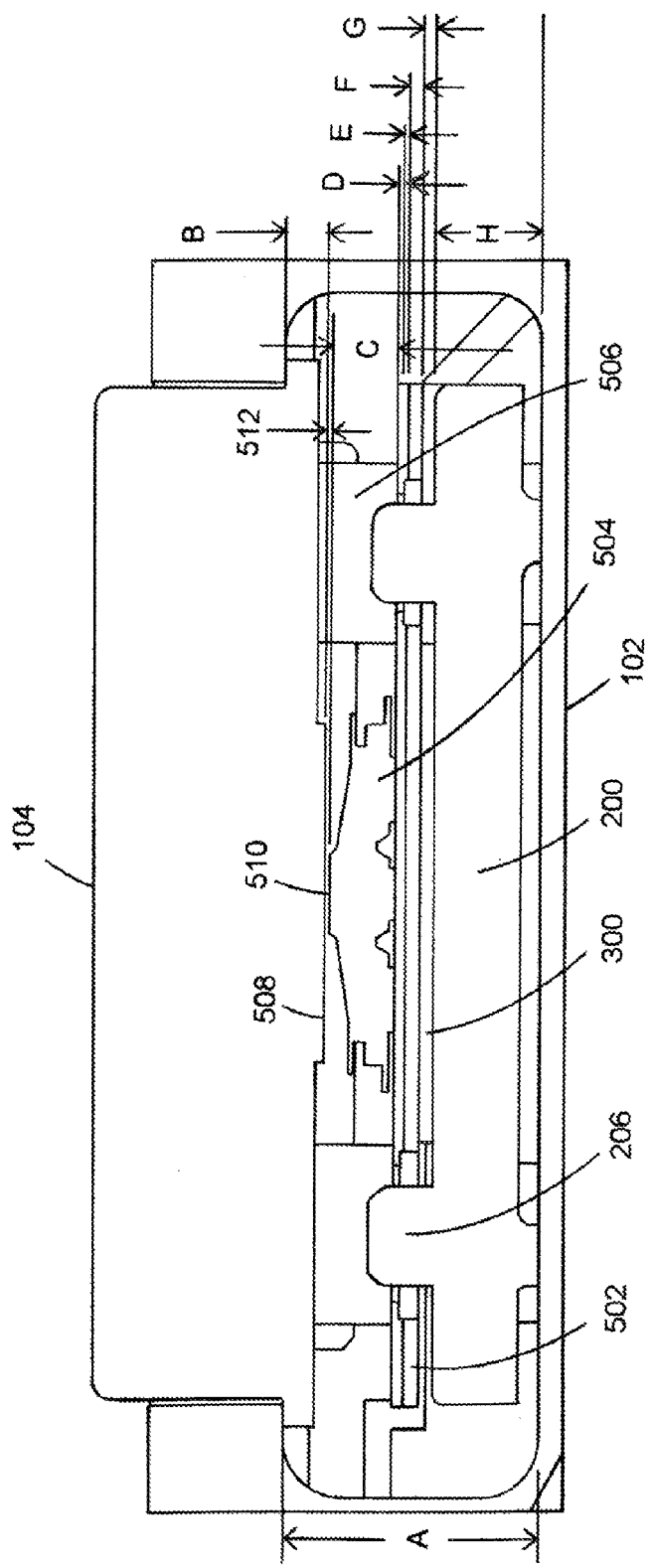
FIG. 5A is an exemplary block diagram illustrating a cross section of embodiment of a tactile switch stack for a computing device.
Figure 5B:
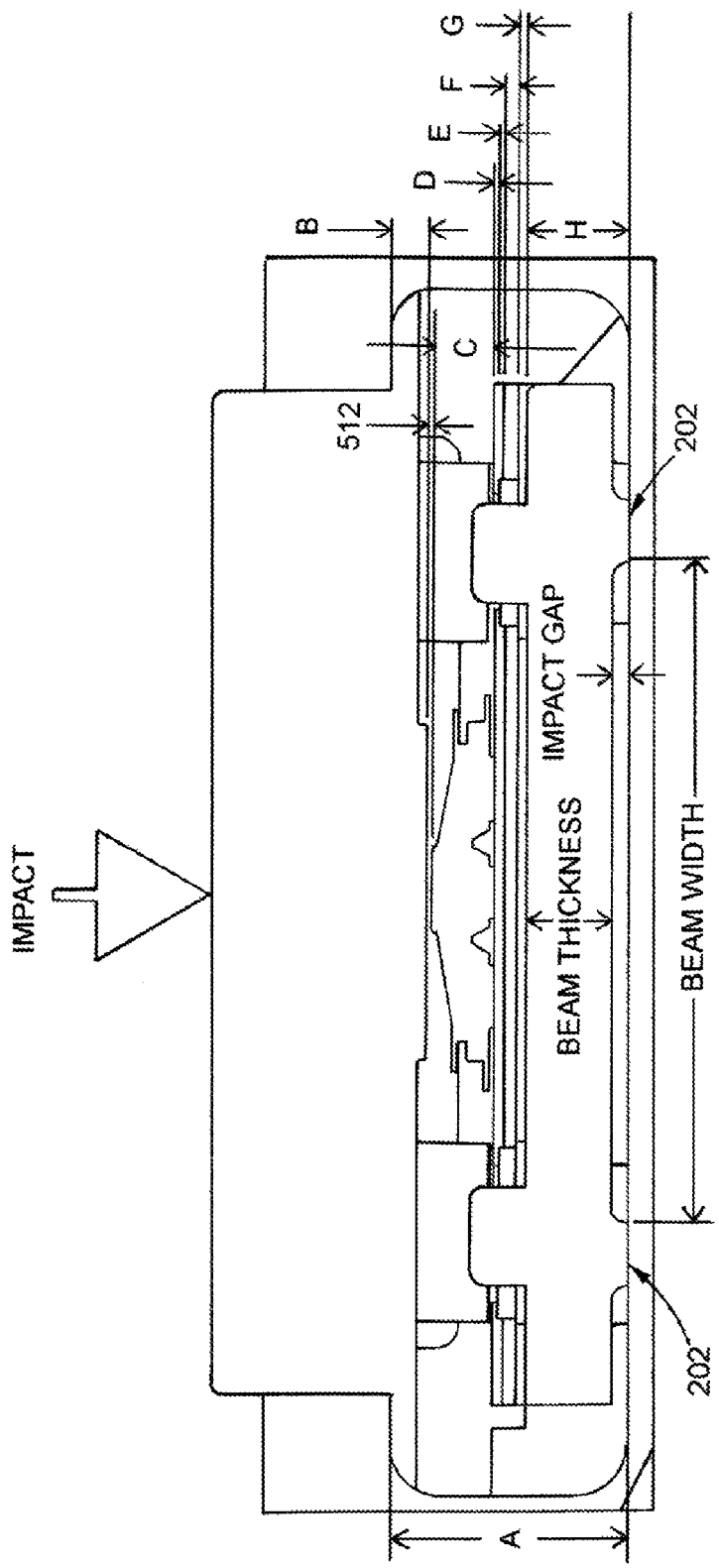
FIG. 5B is an exemplary block diagram illustrating a cross section of an embodiment of a switch stack for impact analysis.

The beam width, beam thickness, and datum feet height form an impact area having a travel distance larger than the travel that would occur during an impact event, such as shown in FIG. 5B. This enables shock absorption resulting from the impact event. The impact event may be an accidental drop of the computing device. The length, thickness and material of the beam 204, as well as the height of the datum feet 202 are chosen to provide impact protection without sacrificing tactile feel. In some embodiments, the impact area is formed between the chassis 102 of the computing device and the switch assembly.

Figure 13:
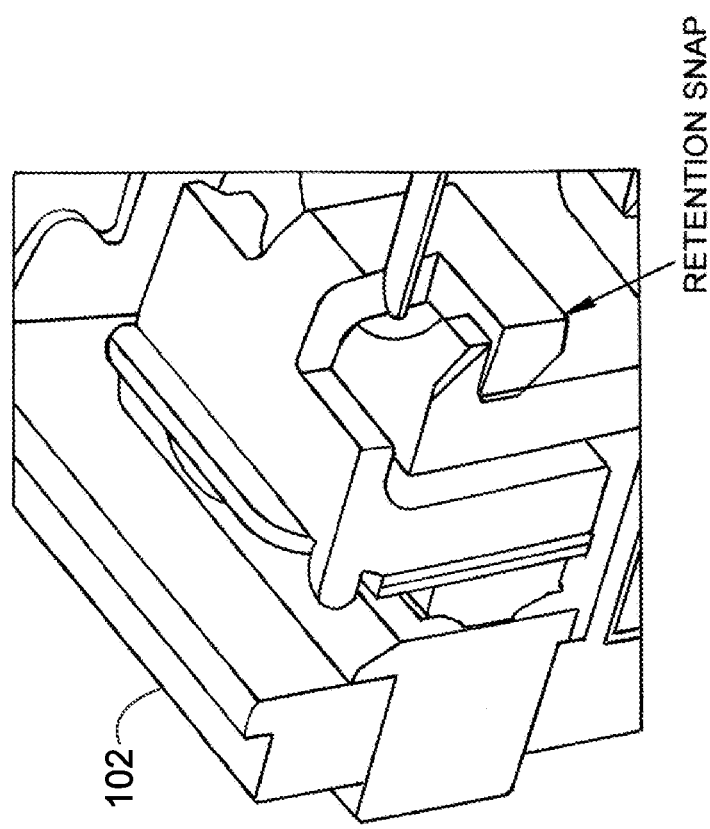
FIG. 13 illustrates a cross-section of an exemplary power button.

In some examples, the switch assembly represents an FPC installed in the bracket 200. The switch assembly is held in the chassis 102 without fasteners or adhesives. For example, the switch assembly may be held in the chassis 102 retention snap as illustrated in FIG. 13.

The bracket 200 further includes at least one pin 206 for locating and retaining the shim 300 that is installed to adjust the button 104 travel. For example, the pin 206 may be located at the upper center of the bracket 200. The plurality of datum surfaces and pins 206 enable accurate positioning of the switch FPC 502 relative to the button 104 (e.g., button actuator surface 508). Further, the surfaces on the pins 206 limit the lateral motion of the shim 300.

Figure 3:
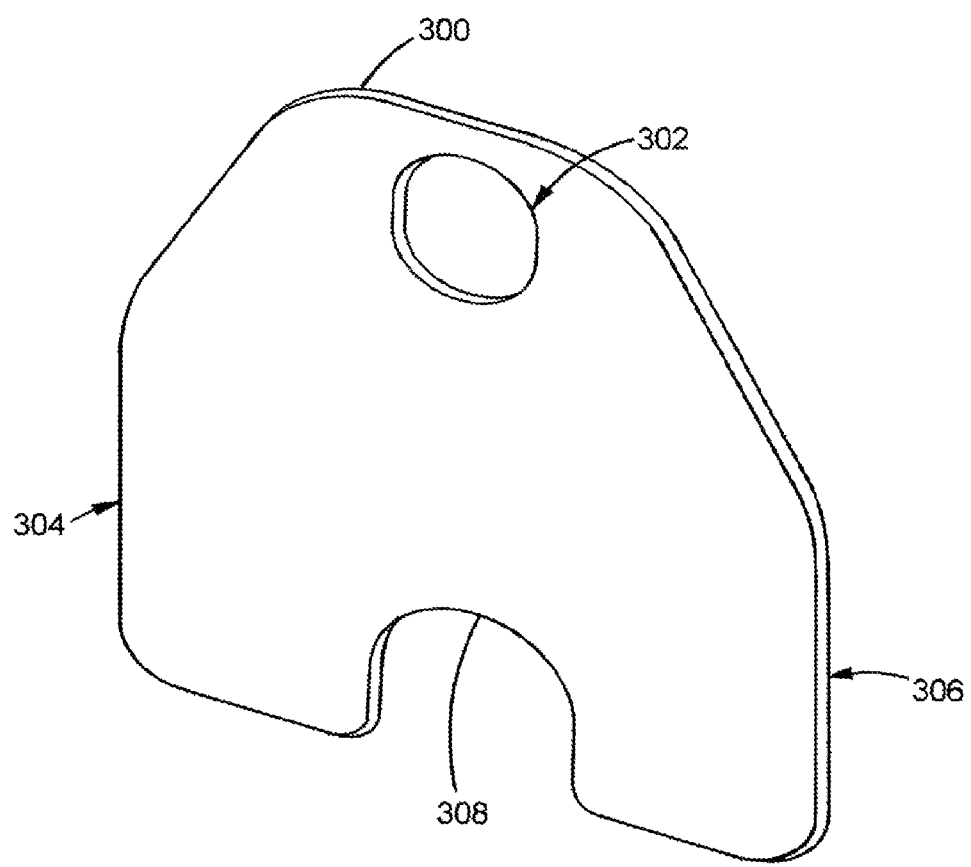
FIG. 3 illustrates an exemplary view of a shim having a single size for a plurality of switch assemblies and designed for selective insertion into a gap.

Referring next to FIG. 3, an exemplary diagram illustrates the shim 300 for adjusting the button 104 travel. In the example of FIG. 3, the shim 300 has a plurality of locating surfaces 304 and 306, a locating hole 302, and a lead-in groove 308 to aid in installing the shim 300 in the chassis 102. The shim 300 is installed in the chassis 102 without use of fasteners or adhesives, in some examples. Aspects of the disclosure contemplate the shim 300 having a shape other than the one shown in FIG. 3 to adjust the gap as described herein. The shim 300 illustrated in FIG. 3 may in some embodiments be made of a smooth and slippery material. For example, the shim 300 may be made, at least in part, of, Teflon, brass, metalized graphite, engineering grade plastic, other materials, or other types of metal, plastic, etc., or any combination of the foregoing.

Figure 4:
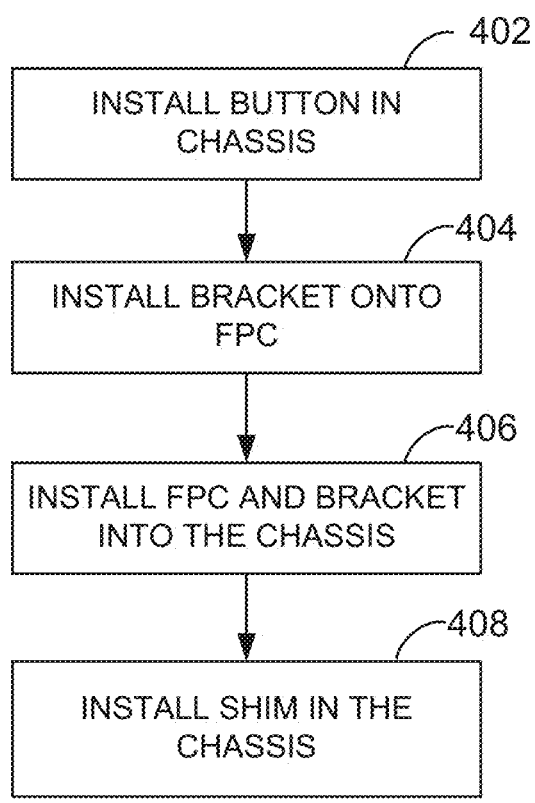
FIG. 4 is a process flow chart illustrating an exemplary method of installing the shim.

Referring next to FIG. 4, an exemplary flow chart illustrates operations for installation of the shim 300 in the chassis 102 of the computing device. At 402, the button 104 is installed in the chassis 102 of the computing device. In this example, the chassis 102 does not have a corresponding switch assembly installed before installing the button 104 in the chassis 102. In an alternative embodiment, the button 104 may be installed after the switch assembly is installed in the chassis 102. In such alternative embodiment, operations 404 and 406 are performed before operation 402.

At 404, FPC 502 is installed into the bracket 200 via the pins 206 (e.g., at least a locating pin) without fasteners or adhesives to ease rework and repair, and improve recyclability. The FPC 502 and bracket 200, when held together, form at least a portion of the switch assembly. The switch assembly (e.g., at least FPC 502 and bracket 200) is held in the chassis 102 without fasteners or adhesives in some examples.

At 406, the switch assembly is installed in the chassis 102. FPC 502 includes the switch 504 that, when inserted into a chassis 102 of the computing device, is configured to receive the button 104. The chassis 102 may be formed of any suitable materials including, ceramics, metal, plastic, glass, or other suitable materials, a combination of these materials, a dielectric or other low-conductivity material. If the gap exceeds an acceptable size, at 408, the shim 300 is installed between the bracket 200 and the FPC 502. The shim 300 is held in the bracket 200 by inserting the pin 206 in the locating hole 302. The datum surfaces on the pin 206 enable locating the shim 300 on the bracket 200.

If the gap exceeds a maximum threshold size, the shim 300 is inserted between the FPC stiffener and the bracket 200. The shim 300 may be alternatively be inserted between the bracket 200 and the chassis 102. This shim 300 may alternatively be inserted between the button actuator surface 508 and a tactile button nub (e.g., on the switch actuator). In embodiments without a bracket 200, the shim 300 may alternatively be inserted between the FPC stiffener and the chassis 102. The shim 300 is installed in the bracket 200 via the pin 206 without adhesives.

Referring to FIGS. 5A and 5B, an exemplary cross section of a tactile switch stack illustrates a tolerance analysis for the switch stack. The tactile switch stack in this example includes a hoop slot in the chassis 102 of the computing device, the button 104, the switch 504, the FPC 502, the shim 300, two foam pads 506, and the bracket 200. The pins 206 of the bracket 200 locate and constrain the FPC 502 on the bracket 200 using the hole and slot on the FPC 502 without using adhesives. Whether the shim 300 is inserted is based on a measurement of the gap between the button 104 and the switch 504.

The dimensions associated with, and/or between, different parts illustrated in FIG. 5A and FIG. 5B are shown in Table 2 below. A tolerance value is associated with the dimension of each part and the dimension between the parts. The tolerance value may be positive or negative. A positive tolerance value represents interference, and a negative tolerance value represents a gap that may or may not be of an acceptable size.

TABLE 2

Dimension Labels and Parts Associations.

| Dimension | Description |
| --- | --- |
| A | Hoop slot |
| B | Button flange to button actuator |
| C | Switch height |
| D | FPC thickness |
| E | FPC adhesive thickness |
| F | Stiffener thickness |

TABLE 2-continued

Dimension Labels and Parts Associations.

| Dimension | Description |
| --- | --- |
| G | Shim thickness |
| H | Support bracket thickness |

The gap between the button actuator surface 508 and the switch actuator surface 510 is derived based on at least one of the dimensions. In some embodiments, the gap represents an amount of travel from the button actuator surface 508 to the switch actuator surface 510 associated with the switch assembly. The gap is configured to receive a shim 300. In some embodiments, the maximum value of the gap represents a lower specification limit (LSL) and the minimum value of the interference represents an upper specification limit (USL). As an example, the is 0.05 mm and the USL is 0.09 mm. The LSL and USL represent the failure limits for the gap.

Figure 6A:
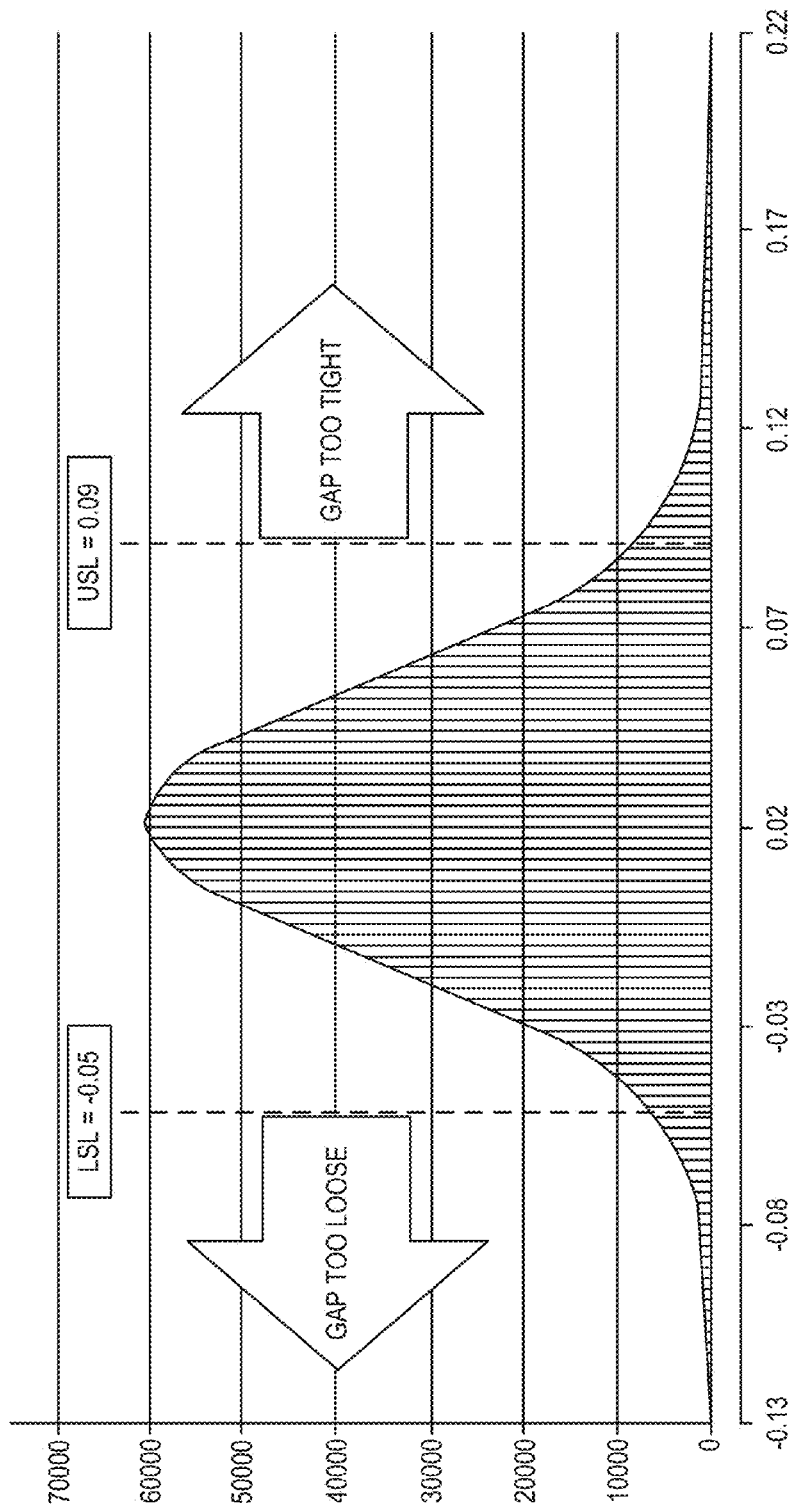
FIG. 6A is an exemplary switch-to-button actuator gap distribution based on a million simulation Monte Carlo model.

The tolerance stack up across the device button assembly results in a gap distribution between the switch actuator surface 510 to the button actuator surface 508 shown in FIG. 6A. FIG. 6A shows that about 4% of the devices either have gap more than LSL or have interference less than USL. This is the same situation for at least four side buttons for Power, Volume Up, Volume Down and Camera. The devices that are out of specification on the high side and have interference >0.09 min are difficult to rework. Rework includes disassembling the devices to select and install a different part (e.g., thinner). The FPC 502 is a delicate assembly that is typically adhered to the chassis 102 with adhesive. Therefore, the risk of damage to the FPC 502 during rework is very high. Most likely, the FPC 502 would be scrap after rework. A device using the design that is out of specification on the low side (<−0.05 mm) may be easily adjusted into specification since it is designed to accept the shim 300 without the need for disassembly.

A distribution of the gaps for a plurality of switch assemblies may be plotted as shown in FIG. 6A, with gap size on the x-axis and a quantity of occurrence on the y-axis. The distribution may be derived empirically from actual manufacturing of the switch assemblies, or may be the result of randomized simulations (e.g., from a Monte Carlo model). The distribution curve in FIG. 6A illustrates the quantity of gaps that fall below the LSL (e.g., the gaps are too large), and the quantity of gaps that are above the USL (e.g., the gaps are too tight). While switch assemblies having a gap that fall below the LSL may be brought back into specification with the addition of the shim 300, the switch assemblies having a gap that is above the USL are difficult to correct. In particular, the switch assemblies having a gap that is above the USL are often discards, resulting in waste and reduced yield.

Some aspects of the disclosure rely on a Monte Carlo analysis to define the failure limits. An exemplary Monte Carlo analysis includes executing computational algorithms to produce randomized samplings of at least pin gauge diameter and shim thickness (e.g., based on the mean and standard deviation for each from the manufacturing process). Other embodiments also randomize sample values for one or more of the other dimensions shown in Table 2 above. These randomized values are then used to measure and plot the gap size as in FIG. 6A and FIG. 6B, from which the failure limits may be defined.

To reduce the quantity of occurrences of switch assemblies having gaps above the USL, aspects of the disclosure adjust the distribution shown in FIG. 6A (e.g., shift left) to that shown in FIG. 6B. FIG. 6B illustrates the gap distribution after adjusting the manufacturing process, between the switch actuator surface 510 and the button actuator surface 508. For example, based on the failure limits, the manufacturing of the parts is adjusted to substantially reduce a statistical occurrence of interference (e.g., reduce the quantity of devices having a gap that is too small). While fixing interference (e.g., the gap is too small) via repair or rework is difficult, a switch assembly having too much button travel may be fixed by adding the shim 300. By shifting the distribution as described herein, more switch assemblies need the shim 300, but fewer switch assemblies have interference, thereby increasing the yield.

Alternatively or in addition, the Monte Carlo analysis may be re-run multiple times using various combinations of pin gauge diameter and/or shim thickness to adjust the distribution to identify the pin gauge diameter and shim thickness that produces the highest yield.

As shown in FIG. 6B, substantially none of the devices has interference above the USL after the distribution shift. The percentage of devices below the LSL has increased to 6.4%. That is, while a greater quantity of devices now will require the shim 300, fewer devices will be wasted due to interference, thus increasing the yield closer to 100%. In another example, after the distribution shift, 4.6% of devices are below LSL and 0.3% of devices lie outside the USL when the shim is not installed. With the addition of the shim 300 to the devices below LSL, only 0.1% of devices are below the LSL, thus increasing the yield.

Figure 7:
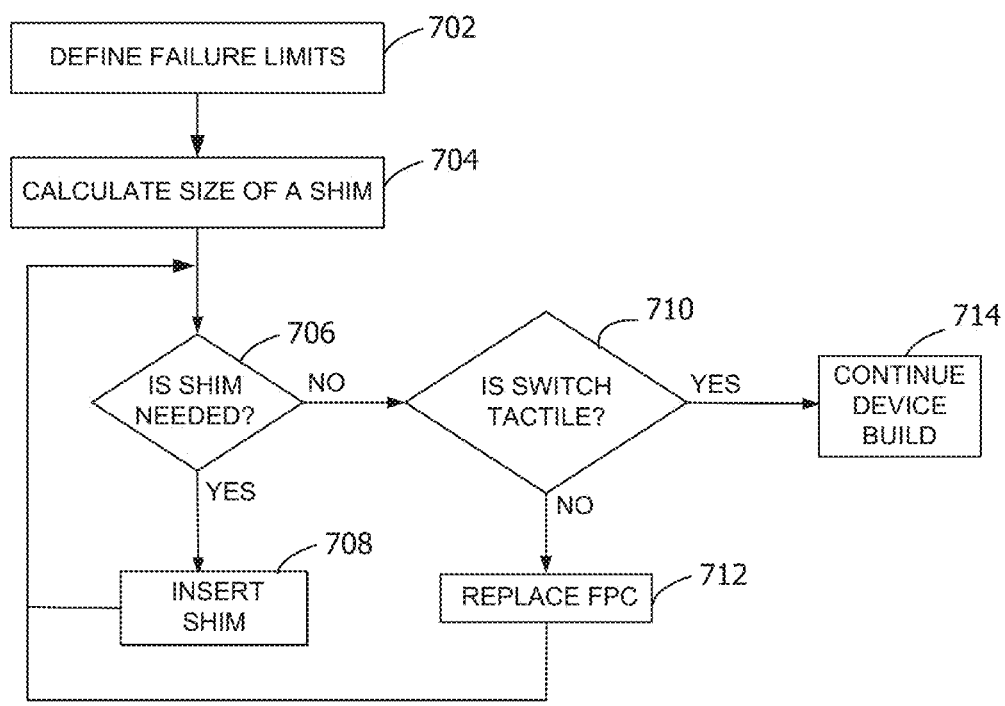
FIG. 7 is a process flow chart illustrating an automated method for assembling and testing a switch in a computing device.

Referring next to FIG. 7, an exemplary flow chart illustrates an automated method for assembling and testing the switch 504 in the computing device. The method may be performed by a computer-controlled device. In some examples, the method is one of the last steps performed in a switch assembly installation process to maximize tactile switch assembly yield. By this method, the manufacturing cost is minimized and desirable quality tactile feel is provided to the customer.

At 702, the failure limits of a gap in a plurality of switch assemblies are defined. In some embodiments, defining the failure limits includes performing, by a simulation device, a simulation analysis such as through a Monte Carlo analysis with pin gauge diameter and shim thickness as the inputs that vary with each simulation run, and the failure limits (e.g., USL and LSL) as output from each simulation run. Results of the analysis are described with reference to FIG. 9A and FIG. 9B. Alternatively or in addition, the failure limits may be determined by testing users (e.g., on a scale of 1 to 5) as to tactile feel of the buttons, and the failure limits are correlated with measurement data of the gap to create a tactility ratio defining the tactility of the switch assembly. However, aspects of the disclosure are operable with any type of analysis to identify the failure limits. Further, different simulation devices may be used to define the failure limits.

Each of the plurality of switch assemblies is configured to receive at least one of the buttons 104. The plurality of switch assemblies corresponds to a particular type of button (e.g., power button, volume up button, volume down button, etc.). The gap in each of the plurality of switch assemblies represents an amount of travel from the button actuator surface 508 to the switch actuator surface 510. At 704, a single size for the shim 300 is calculated based on the defined failure limits, where the single size shim 300 is used for adjusting the gap, as needed, in the plurality of switch assemblies. In this manner, the calculated size of the shim 300, and the use of the shim 300 depending on the measured gap size, optimizes the yield for the plurality of switch assemblies. No shim 300 of a different size is used for the plurality of switch assemblies for the particular type of button (e.g., power button, volume down button, volume up button, etc.). For example, aspects of the disclosure operate to calculate a first shim size for all the switch assemblies for the power button, a second shim size for all the switch assemblies for the volume up button, a third shim size for all the switch assemblies for the volume down button, etc. In this manner, calculating the single size of the shim 300 for each particular set of switch assemblies minimizes the quantity of devices that need a shim (e.g., where the gap exceeds a minimum threshold value) while maximizing yield for the particular set of switch assemblies.

Whether the shim 300 should be inserted in the gap is determined at 706. If the shim 300 is needed to reduce the gap size, the shim 300 having the determined single size is inserted into the switch assembly based on the measured gap at 708. In some examples, the shim is inserted without adhesives (e.g., between switch FPC 504 and bracket 200).

In an example, selectively inserting the shim 300 includes measuring the gap using a pin gauge having a calculated, single thickness value (e.g., from the simulation analysis that optimized yield) and inserting the shim 300 based on the measured gap. In alternative embodiments, the gap may be measured by transmitting radio waves into the gap and measuring the time between received radio waves and transmitted waves. Other methods of measuring the gap are contemplated by the disclosure.

In an example, measuring the gap includes measuring the gap from the button actuator surface 508 to a device chassis 102 without the switch assembly installed therein. In this example, the bracket 200 and FPC 502 are installed after measuring the gap, and the shim 300 is installed based on a determination that the gap should be reduced in size (e.g., install the shim 300). Selectively inserting the shim 300 includes determining whether the gap from the chassis 102 to the button actuator surface 508 exceeds a predefined threshold value. Thereafter, the switch assembly is installed into the computing device. In this manner, the shim 300 having the determined single shim size is inserted into the gap based on the measured gap size.

In another example, the gap is measured from the button actuator surface 508 to the bracket 200 after installing the bracket 200 in the chassis 102. In still another example, the gap is measured after installing the switch assembly in the chassis. In this scenario, the gap is the distance travelled by the button actuator surface 508 to the switch actuator surface 510.

After making the determination to install the shim 300, a test is performed at 710 to check the tactility of the switch 504. If the switch 504 provides a less than desirable tactile feel, the FPC 502 of the switch assembly is replaced at 712. If the switch is found tactile and provides appropriate tactile feel, device building activities continue at 714. In some embodiments, a tactility ratio for the switch assembly is calculated based on the failure limits.

Figure 8:
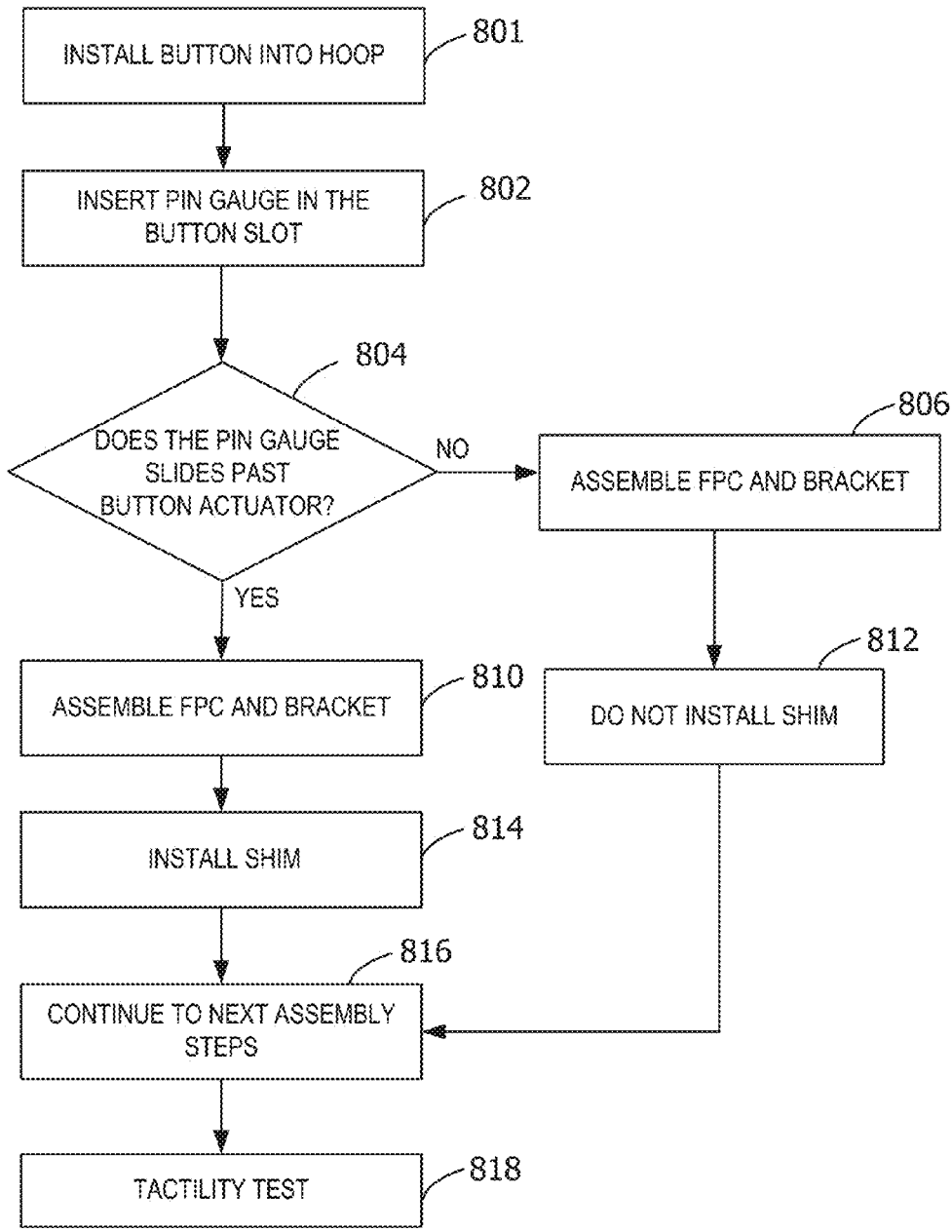
FIG. 8 is a process flow chart illustrating a method for deciding whether to add a shim to a particular switch assembly.

FIG. 8 is a flow chart that illustrates an example embodiment for deciding whether or not the shim 300 is to be inserted. At 801, the button 104 is installed into a hoop in the chassis 102. A pin gauge is attempted to be inserted in the button slot and slid across the button actuator surface 508 at 802. At 804, it is determined whether the pin gauge slides past the button actuator surface 508. If the pin gauge does not slide past the button actuator surface 508, the switch assembly is installed in the chassis 102 at 806 and the shim 300 is not installed at 812. At 804, if it is determined that the pin gauge is able to slide through the button slot and past the button actuator surface 508, the switch assembly including the bracket 200 and FPC 502 is installed in the chassis 102 at 810 and the shim 300 is needed. At 814, a shim is installed in the gap left after installing the switch assembly at 810. Other assembly steps may be performed at 816 after installing the switch assembly and shim 300 in the button slot. A tactility test is performed at 818.

Figure 9A:
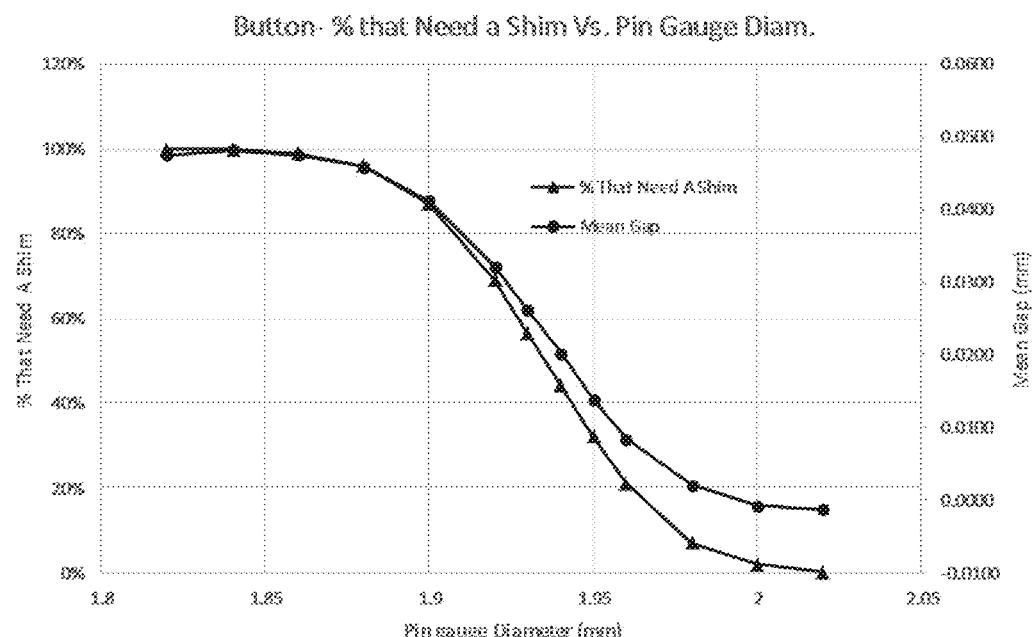
FIGS. 9A and 9B illustrate simulation results showing variations in the yields when modifying gap and pin gauge diameters.
Figure 9B:
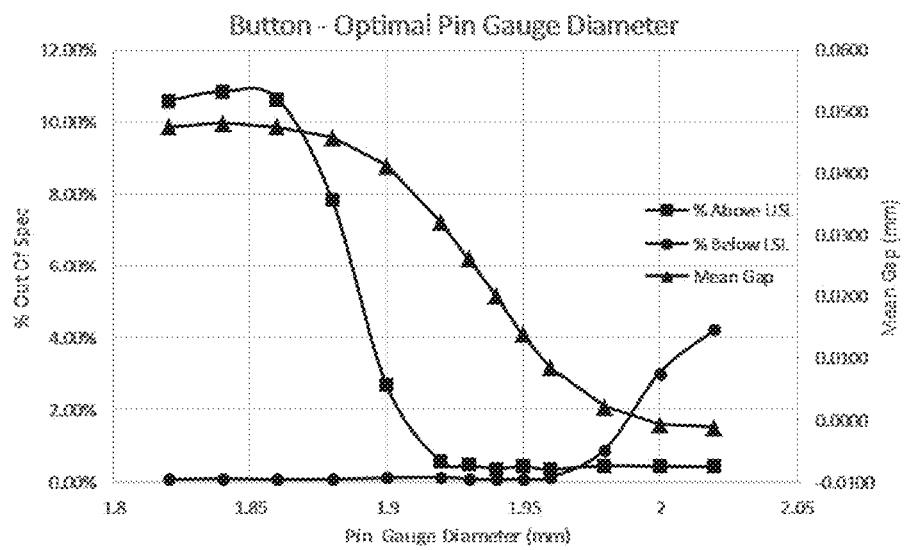

Referring to FIGS. 9A and 9B, the simulation results show the variation in the yield (e.g., percentage of devices that need the shim 300) on modifying the parameters. The parameters are changed to optimize yield of the system. For example, the pin gauge diameter may be changed, the simulation re-run to see if the yield improves (e.g., reduce the percentage of products that are out of specification). In another embodiment, the shim thickness is changed and the simulation is re-run to determine the change in the yield.

Figure 10:
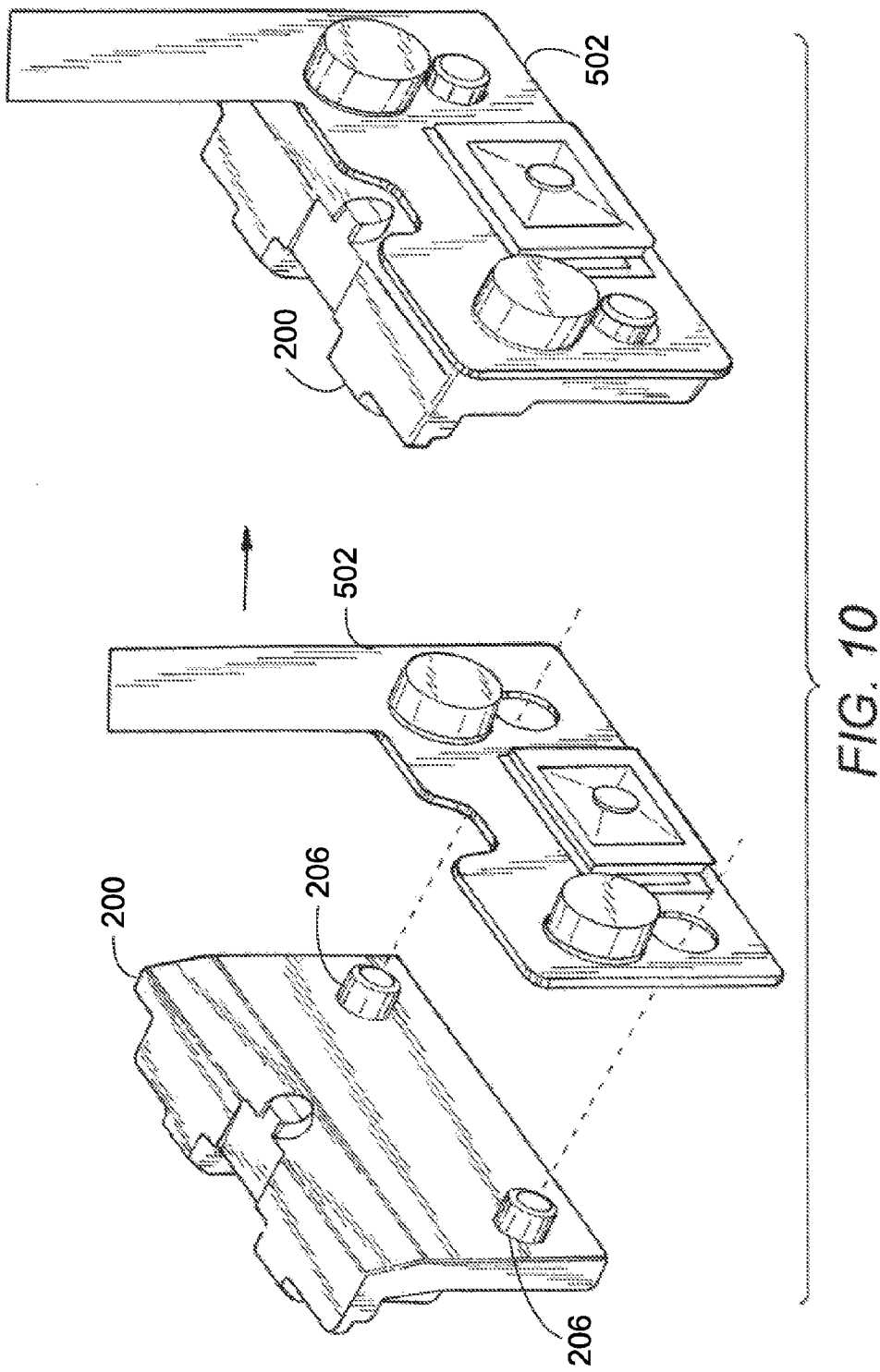
FIG. 10 illustrates installation of an exemplary bracket onto a flexible printed circuit (FPC).

FIG. 10 illustrates installation of the bracket 200 onto the FPC 502. The pins 206 on the bracket are used to locate the bracket on the FPC 502, and to minimize movement of the bracket when contacting the FPC 502.

Figure 11:
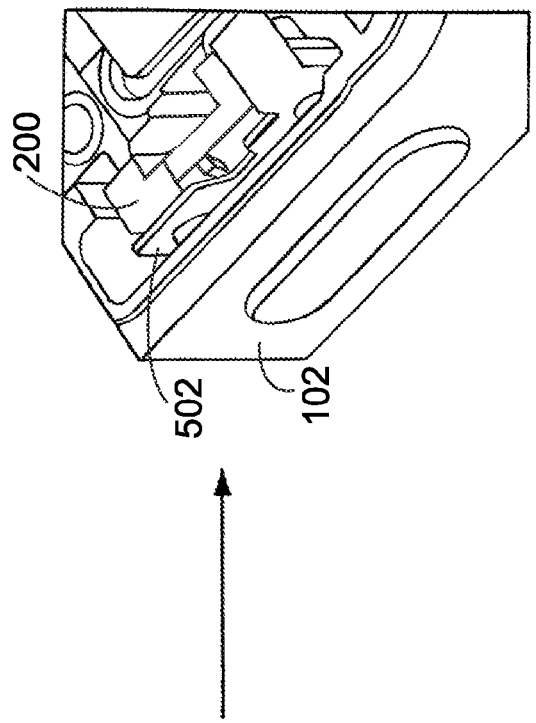
FIG. 11 illustrates installation of the exemplary FPC and bracket assembly into a chassis of the computing device.
Figure 11:
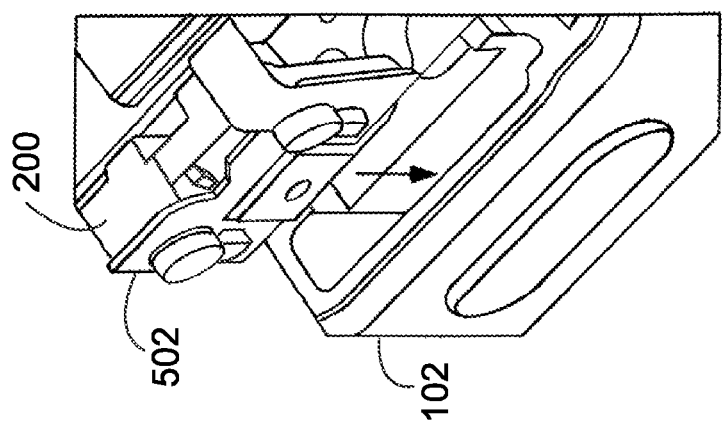

FIG. 11 illustrates installation of the bracket 200 and FPC 502 assembly into the chassis 102 of the computing device. In some embodiments, the assembly snaps into the chassis 102.

Figure 12:
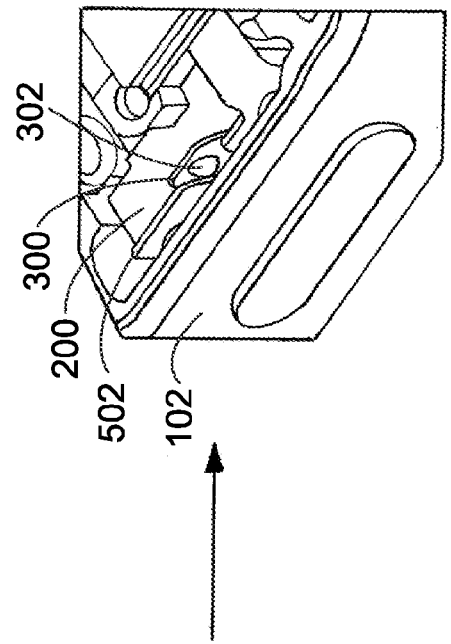
FIG. 12 illustrates installation of a shim between the bracket and the FPC.
Figure 12:
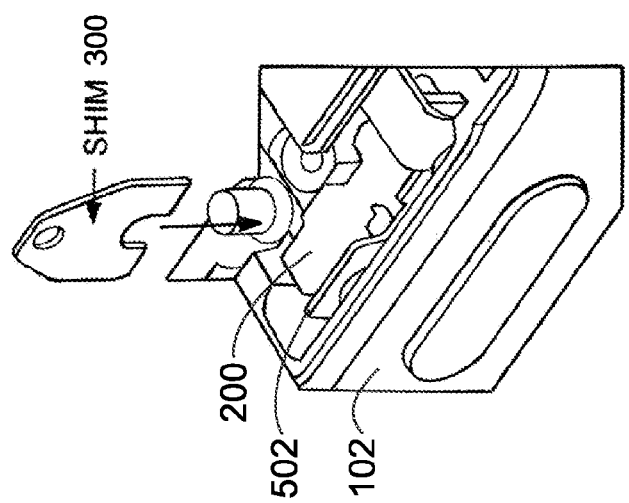

FIG. 12 illustrates installation of the shim 300 between the bracket 200 and the FTC 502. In this example, the locating hole 302 of the shim 300 engages the top center pin of the bracket 200

FIG. 13 illustrates a cross-section of an exemplary power button. In this example, a retention snap retains the power button assembly in the chassis 102.

The embodiments illustrated and described herein as well as embodiments not specifically described herein but within the scope of aspects of the invention constitute exemplary means for assembling and testing the switch 504 in the computing device. Some examples include means for defining the failure limits of the gap in a plurality of switch assemblies, and means for calculating, based on the defined failure limits, a single size for the shim 300 for use in the plurality of switch assemblies.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that the matter contained in the above description and shown in the accompanying drawings shall be interpreted as illustrative and not in a limiting sense.

What is claimed is:

1. A computing device having a switch assembly, the switch assembly comprising:
    a bracket, the bracket having a plurality of datum surfaces, in three dimensions, comprising at least two datum feet each having a height, and a beam transverse across the bracket, having a width and a thickness, wherein the plurality of datum surfaces form an impact area between a chassis of the computing device and the switch assembly, the impact area configured to absorb energy to prevent a switch failure during an impact event; and
    a gap configured to receive a shim of single size based on failure limits of the gap, the gap representing an amount of travel from a button to a switch actuator associated with the switch assembly, the height of the datum feet, and the width and the thickness of the beam being dynamically calculated based on the gap.

2. The computing device of claim 1, wherein the impact area has a travel distance greater than the amount of travel occurring during the impact event.

3. The computing device of claim 1, wherein the bracket further comprises a pin, different from the two datum feet, for locating and retaining the shim installed to adjust the gap.

4. The computing device of claim 3 wherein the shim is installed in the bracket via the pin without adhesives.

5. The computing device of claim 1 wherein the plurality of datum surfaces enable accurate positioning of a switch flexible printed circuit (FPC) relative to the button in three dimensions.

6. A switch assembly comprising:
    a switch actuator that, when inserted into a chassis of a computing device, is configured to receive a button; and
    a gap configured to receive a shim based on failure limits of the gap, a size of the shim being calculated based on the failure limits of the gap, the failure limits being determined using a simulation with a pin gauge diameter and shim thickness as inputs that vary with each simulation.

7. The switch assembly of claim 6 wherein a manufacturing of parts is adjusted based on the failure limits to substantially reduce a statistical occurrence of interference.

8. The switch assembly of claim 6 wherein the shim is installed without adhesives.

9. The switch assembly of claim 6 wherein the shim is received between the switch actuator and the button.

10. The switch assembly of claim 6 wherein the switch assembly is held in the chassis without fasteners.

11. The switch assembly of claim 6 wherein a switch flexible printed circuit (FPC) is placed relative to the switch actuator without fasteners.

12. An automated method for assembling and testing a switch in a computing device, the method comprising:
    defining failure limits of a gap in a plurality of switch assemblies, wherein defining failure limits includes performing a simulation analysis with a pin gauge diameter and shim thickness as inputs that vary with each simulation analysis, each of the plurality of switch assemblies configured to receive a button, the gap in each of the plurality of switch assemblies representing an amount of travel from the button to a switch actuator; and
    based on the defined failure limits, calculating a single size for a shim, the single size maximizing a yield for the plurality of switch assemblies, wherein for each of the plurality of switch assemblies, the shim having the calculated single size is selectively inserted into the one of the plurality of switch assemblies based on the gap for the one of the plurality of the switch assemblies.

13. The method of claim 12 further comprising calculating, based on the defined failure limits, a single thickness value for use in measuring the gap in each of the plurality of switches.

14. The method of claim 13 wherein selectively inserting the shim comprises measuring the gap using a pin gauge having the calculated, single thickness value and inserting the shim based on the measured gap.

15. The method of claim 14 wherein measuring the gap comprises measuring a gap from the button to a device chassis without a bracket and switch actuator installed therein.

16. The method of claim 12 wherein selectively inserting the shim comprises:
determining whether the gap across a bracket from a device chassis to a button surface exceeds a predefined threshold value;
installing one of the plurality of switch assemblies into the computing device; and
inserting a shim having the calculated single size into the gap based on the determining.

17. The method of claim 12 wherein inserting the shim comprises inserting the shim between a bracket and a chassis or between a button actuator surface and a tactile button nub.

18. The method of claim 12 wherein the method is performed by a computer-controlled system.

19. The method of claim 12 wherein the method is the last step in a switch assembly/installation process.

20. The method of claim 12 wherein defining the failure limits comprises defining an upper failure limit and a lower failure limit as outputs from the simulation analysis, wherein the upper failure limit represents a maximum amount of travel from the button to the switch actuator and the lower failure limit represents a minimum value of the interference between the button and the switch actuator.

* * * * *